Patented Oct. 3, 1922.

1,430,585

UNITED STATES PATENT OFFICE.

ALEXANDER S. RAMAGE, OF DETROIT, MICHIGAN, ASSIGNOR TO BOSTAPH ENGINEERING CORPORATION, OF DETROIT, MICHIGAN, A CORPORATION OF NEW YORK.

PROCESS OF PRODUCING AROMATIC HYDROCARBONS.

No Drawing. Application filed June 24, 1918, Serial No. 241,645. Renewed February 23, 1922. Serial No. 538,772.

*To all whom it may concern:*

Be it known that I, ALEXANDER S. RAMAGE, a citizen of the United States, residing at Detroit, in the county of Wayne and State of Michigan, have invented certain new and useful Improvements in Processes of Producing Aromatic Hydrocarbons, of which the following is a specification.

In my prior Patent 1,208,833, patented December 19, 1916, I have described and claimed a process of producing phenols from high-boiling tar acids comprising subjecting such acids in presence of a catalyst and at an elevated temperature, to the action of hydrogen. The preferred operating conditions as described in that patent comprised subjecting the high-boiling tar acids to the action of hydrogen in the presence of a nickel catalyst at a temperature of about 600°–650°. The operation as described in the patent was carried out in a tube having a heated zone three feet, six inches in length, and the higher-boiling (unconverted) residue was re-processed under the same conditions to continue or complete the conversion.

I have found that under properly regulated conditions involving an increase in the time of heating, preferably a somewhat higher temperature, and preferably also the employment as a catlyst of a lower oxid of iron, it is possible to convert phenols (which constitute the final product of the aforesaid patent) into aromatic hydrocarbons, including benzene and toluene. This conversion involves the replacement by hydrogen of the hydroxyl group which is characteristic of the phenols, and may properly be represented in a typical case by the following equation, illustrating the transformation of cresol into toluene:

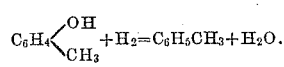

Under my preferred operating conditions, as described below, certain side reactions involving the production of benzene and of phenol (hydroxy-benzene) take place at the same time and may be represented thus:

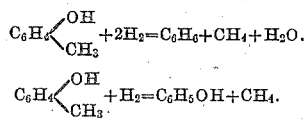

According to the reacting conditions the proportions of the several products obtained may be rather widely varied, and the process will be described by reference to one specific example thereof according to which a mixture containing a predominating proportion of toluene was prepared from cresol.

The apparatus used was an iron tube approximately twenty feet in length by three inches in internal diameter, and mounted at a slight inclination to the horizontal. The tube was wound with resistance wire in such manner that the upper end, which served primarily as a vaporizing chamber into which the liquid cresol was fed, might be heated to about 300° C.; while the balance of the contents of the tube were heated under careful control to a uniformly maintained temperature of about 706° C. The tube was initially filled with ferric oxid which was subjected to reduction, short of the production of metallic iron, by means of a current of a reducing gas, such as hydrogen, at the appropriate temperature. Cresol was supplied to the vaporizing chamber at the rate of about 8.0 pounds per hour, together with a stream of hydrogen in some excess of the reaction requirements. The exit end of the tube led to a condensing and scrubbing system adapted for the recovery of the products, the fixed gases passing to a gasometer. Under these specific conditions there was obtained a product which, when separated from the unconverted cresol (returned for re-processing) contained:—

Benzene with small proportions of
 light hydrocarbons, mostly naph-
 thenes _____ 8.28%
Toluene _____ 68.38%
Phenol _____ 13.20%

Crude tar acids, consisting chiefly of cresols, treated under identical conditions, yielded 35.7% of a light distillate consisting principally of benzene and toluene, and 42.02% of phenol. The original tar acids contained:—

| | |
|---|---|
| Water | 8.4% |
| Distillate up to 170° C | 4.6% |
| 170–188° C. (mostly phenol) | 6.4% |
| 188–195° C. } (mostly cresols) | { 34.6% |
| 195–210° C. | 29.% |
| 210–220° C. (xylene fraction) | 5.% |
| Pitch | 12.% |

My invention is not of course restricted to the particular operating conditions described above, since these will necessarily be varied somewhat in accordance with the raw materials treated as well as according to the particular products desired. At present, however, I prefer to employ ferrous oxid as the catalyst, and to use temperatures of the general order mentioned above. My invention contemplates broadly the conversion by a process of hydrogenation in presence of a catalyst, of phenolic bodies into the corresponding aromatic hydrocarbon derivatives. The term "phenols" is used herein to include the cresols and higher homologues of phenol (hydroxy-benzene).

I claim:—

Process of converting phenols into aromatic hydrocarbons comprising reacting thereon with hydrogen at a temperature approximating 700° C. in presence of a catalyst comprising a lower oxid of iron.

In testimony whereof, I affix my signature.

ALEXANDER S. RAMAGE.